June 15, 1954     E. E. SIVACEK     2,681,119
FLUID MOTOR MECHANISM
Original Filed March 22, 1948     2 Sheets-Sheet 1
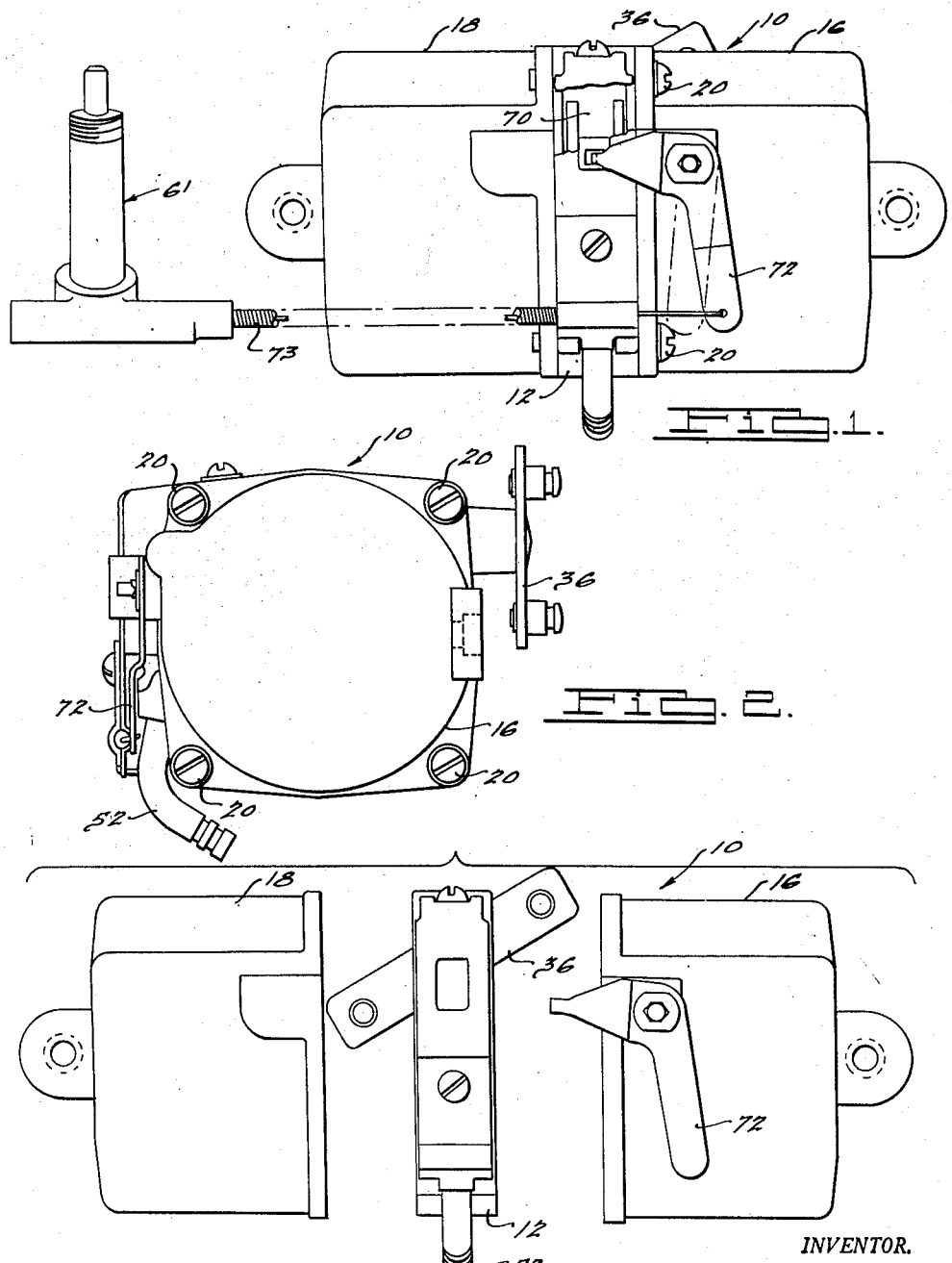
INVENTOR.
Emil E. Sivacek
BY
Harness, Dickey & Pierce
ATTORNEYS

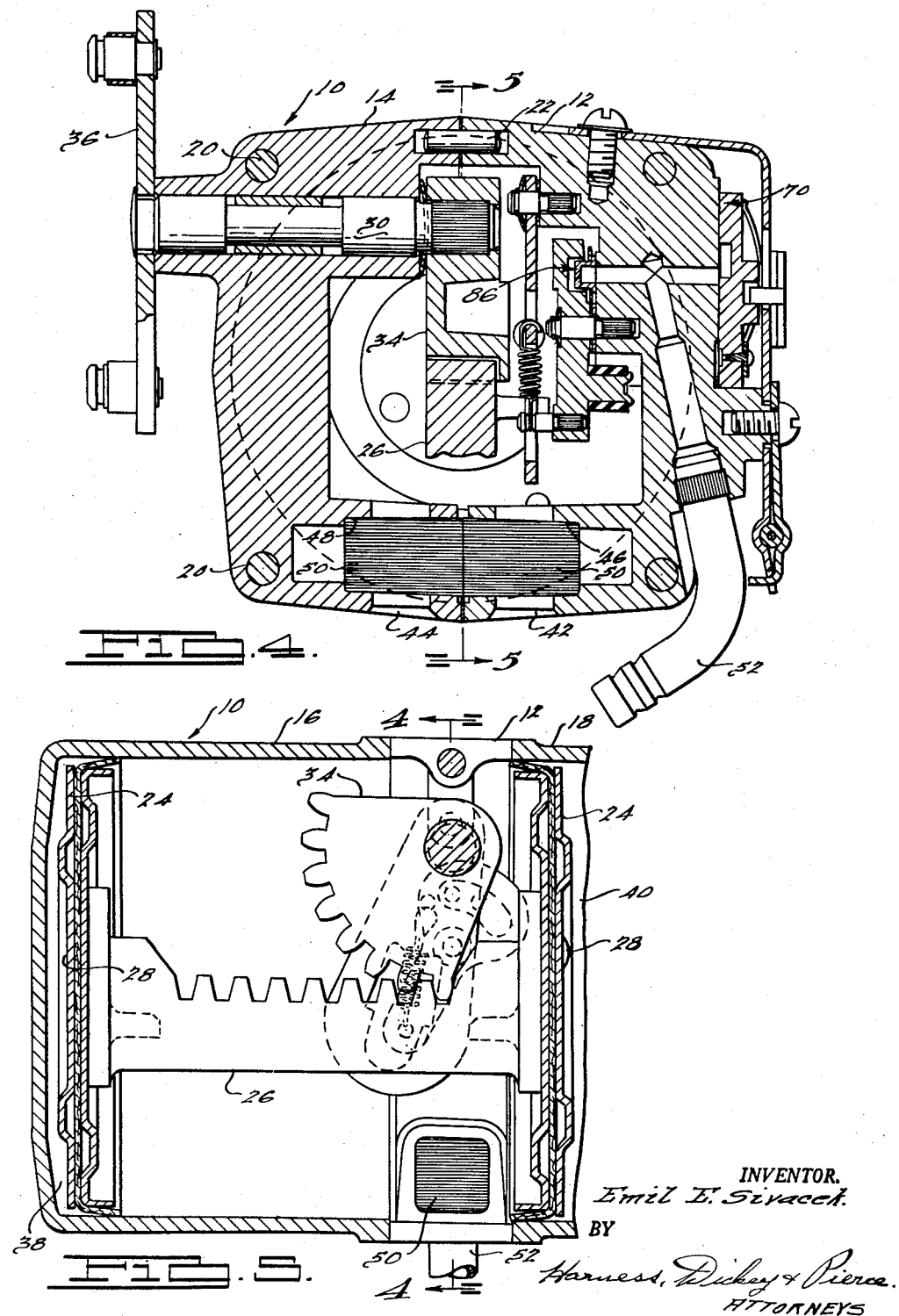

Patented June 15, 1954

2,681,119

UNITED STATES PATENT OFFICE 2,681,119

FLUID MOTOR MECHANISM

Emil E. Sivacek, Ann Arbor, Mich., assignor to King-Seeley Corporation, Ann Arbor, Mich., a corporation of Michigan Original application March 22, 1948, Serial No. 16,271. Divided and this application December 20, 1950, Serial No. 201,825

2 Claims. (Cl. 181—33)

The present invention relates to fluid motors and particularly relates to a fluid motor construction of the type embodying automatically operable reversing valve mechanism and having particular utility for operating automobile windshield wipers.

This application is a division of my copending application on Fluid Motor Mechanism, Serial No. 16,271, filed March 22, 1948.

Principal objects of the present invention are to provide a fluid motor mechanism of the above generally indicated type which is simple in construction, economical of manufacture and assembly, and which is reliable and efficient in operation; to provide such a mechanism embodying a casing of improved construction; and to provide in such a mechanism, a casing having improved silencing means incorporated therein.

With the above as well as other and more detailed objects in view, which will become apparent from a consideration of the accompanying drawings, the following description, and the appended claims, a preferred but illustrative embodiment is shown in the drawings, throughout the several views of which corresponding reference characters are used to designate corresponding parts and wherein:

Figure 1 is a view in side elevation showing a preferred embodiment of the invention;

Figure 2 is an end view of the embodiment shown in Figure 1;

Figure 3 is an exploded view of the casing of the embodiment shown in Figure 1;

Figure 4 is an enlarged view in vertical transverse section taken along the line 4—4 of Figure 5; and, Figure 5 is a partial view in longitudinal section taken substantially along the line 5—5 of Figure 4.

Although the fluid motor mechanism of the present invention has a particular utility when used for operating automobile windshield wipers it will be appreciated by those skilled in the art that in its generic aspects it has other uses within the scope of the present invention.

Referring to the drawings, the casing or housing 10 of the fluid motor there illustrated is generally cylindrical and comprises complementary center members 12 and 14 (Fig. 4), and cup-shaped end members 16 and 18. The end members 16 and 18 are removably secured to the complementary members 12 and 14 by a plurality of screws 20 which at the same time serve to maintain the complementary center members 12 and 14 in abutting relation. The center members are located relative to each other and held in position during assembly by a longitudinally serrated dowel pin 22 having one end mounted in the center member 12 and the other end received in a complementary recess formed in the center member 14.

Referring to Figs. 4 and 5, the interior of the housing 10 is cylindrically shaped and slidably receives a piston assembly comprising a pair of spaced pistons 24 rigidly mounted on a connecting rack 26 by means of rivets 28. A motor output shaft 30 is journaled in the center member 14 of the casing 10 and is driven through a gear segment 34 mounted on a longitudinally serrated portion adjacent its inner end and continuously meshing with the rack 26. Accordingly, reciprocative movements of the piston assembly are translated into oscillatory or rocking movements by the output shaft 30. In the illustrated embodiment, the output shaft 30 at its outer end is provided with a crank 36 which is adapted for connection to the mechanism to be operated by the motor.

The pistons 24 co-operate with the end members 16 and 18 of the casing 10 to define chamber spaces 38 and 40 between the pistons 24 and their respective end members. The space between the pistons 24 is continuously vented to atmosphere by passages 42 and 44 formed in the complementary center members 12 and 14, respectively, of the casing 10. The passage 42 has an enlarged center portion 46 communicating with a similar and complementary enlarged center portion 48 in the passage 44. A silencing or sound deadening material 50, such as felt or other material, is disposed within the enlarged center portions 46 and 48 and is effective to greatly reduce the noise audible from the exterior of the motor, as well as to filter the air which passes therethrough.

It will be appreciated that reciprocation of the piston is effected by applying differential fluid pressures in the chamber spaces 38 and 40. These differential pressures may of course be obtained from any suitable source. For example, in utilizing the present motor to drive an automobile windshield wiper system, the pressure differential may be the difference between atmospheric pressure and a sub-atmospheric pressure obtained in usual fashion by connecting the motor inlet stem 52 to the intake manifold of the associated engine. These differential pressures are communicated to the spaces 38 and 40 at opposite ends of the housing 10 by suitable passages communicating with the space between the pistons 24 and the stem 52, which passages are controlled by the manual control valve generally indicated at 70 and the automatic reversing valve generally indicated at 86 to provide the desired fluid circuits for operating and parking. These passages and valves 70 and 86 may be of any suitable design, the particular construction represented in the drawings being the same as that shown and described in greater detail in my above mentioned copending application Serial Number 16,271.

Although only a single embodiment of the invention has been described in detail, it will be appreciated that various modifications in the form, number and arrangement of the parts may be made without departing from the spirit of the invention or from the scope of the appended claims.

What is claimed is:

1. In a fluid motor mechanism actuated by a pressure differential between atmospheric pressure and another pressure, a casing comprising complementary center members and end members secured to said center members, said center members being formed to provide passage means communicating at one end thereof with a portion of the interior of said casing and at the other end thereof with the exterior of said casing to at all times vent said portion of the interior of said casing to atmosphere, said passage means including an intermediate portion defining an enlarged chamber having complementary portions, one of said portions being formed in one of said complementary center members and the other of said complementary portions being formed in the other of said center members.

2. In a fluid motor mechanism actuated by a pressure differential between atmospheric pressure and another pressure, a casing comprising complementary center members and end members secured to said center members, said center members being formed to provide passage means communicating at one end thereof with a portion of the interior of said casing and at the other end thereof with the exterior of said casing to at all times vent said portion of the interior of said casing to atmosphere, said passage means including an intermediate portion defining an enlarged chamber having complementary portions, one of said portions being formed in one of said complementary center members and the other of said complementary portions being formed in the other of said center members, and a sound deadening packing received in said enlarged chamber.

References Cited in the file of this patent

UNITED STATES PATENTS

| Number | Name | Date |
| --- | --- | --- |
| 1,774,376 | Hueber et al. | Aug. 26, 1930 |
| 2,078,754 | Day | Apr. 27, 1937 |
| 2,218,719 | Richards | Oct. 22, 1940 |
| 2,385,084 | Koppelman | Sept. 18, 1945 |
| 2,484,548 | Bitzer | Oct. 11, 1949 |

FOREIGN PATENTS

| Number | Country | Date |
| --- | --- | --- |
| 473,296 | Great Britain | Oct. 11, 1937 |
| 537,438 | Great Britain | June 23, 1941 |
| 817,517 | France | Sept. 4, 1937 |